April 17, 1934.    O. U. ZERK    1,955,400
LUBRICANT METERING UNIT
Filed Nov. 9, 1929
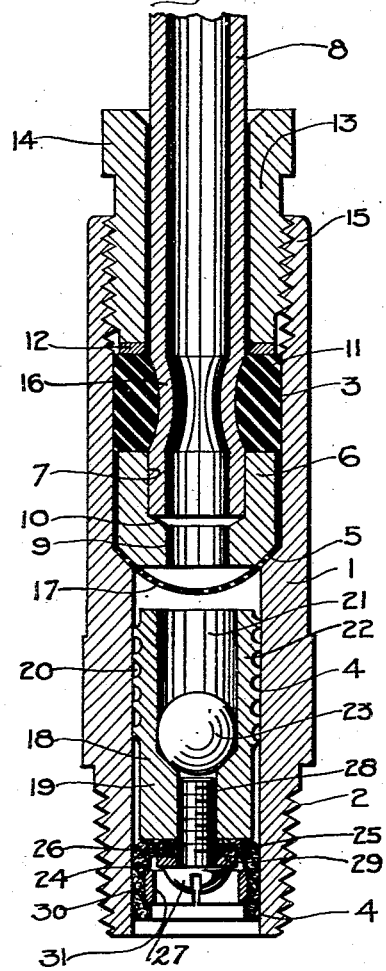
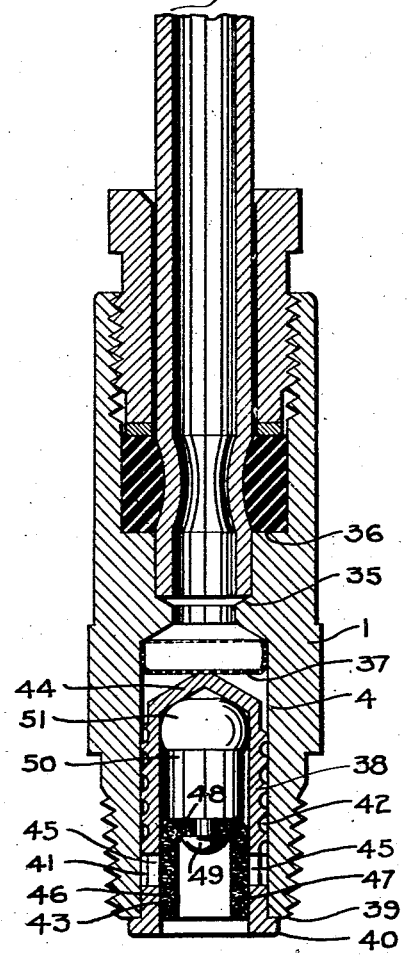
INVENTOR.
Oscar U. Zerk.
BY Slough & Canfield
ATTORNEYS Patented Apr. 17, 1934

1,955,400

UNITED STATES PATENT OFFICE 1,955,400

LUBRICANT METERING UNIT

Oscar U. Zerk, Chicago, Ill., assignor to Alemite Corporation, Chicago, Ill., a corporation of Delaware Application November 9, 1929, Serial No. 406,112

2 Claims. (Cl. 184—7)

My invention relates to centralized lubrication, and while it is particularly applicable to automotive work, more particularly to the lubrication of the chassis of vehicles, such as automobiles, tractors, gun carriages, war tanks, locomotives, aeroplanes, airships, sea vessels, and the like, it is also adaptable to industrial lubrication, that is to the lubrication of stationary machines, such as stamping presses, printing presses, textile machinery, shafting and the various types of machines and machine tools employed in modern industry.

Prior systems of centralized lubrication commonly employ an oil pump connected to an oil reservoir, a pipeline system leading from the pump to the bearings, and metering units interposed between the pipeline and the various bearings. Of these metering units three types are commonly employed, namely, those of the pressure reservoir type, of the measuring valve type, and of the resistance unit type.

My invention involves the use of metering units of the resistance unit type.

Before the advent of the metering unit, plain check valves were commonly interposed between the pump employed in the lubricating system, and the bearings to control the flow of lubricant to the bearings. This prior system has proven to be unsatisfactory due to the variation in resistance offered by the valve to the flow, variations in valve spring pressure, the resulting variations in the height of the valve seat, and the difference in the dimensions of the oil passage leading to the valve seats, being causes of some of the more disturbing variations in operation of different units of the same or different installations.

A larger oil passage and a weaker spring would effect a quicker and larger opening by the check valve than where a smaller passage and a stronger spring is used with another check valve. The lubricant under pressure always seeking the path of least resistance would be discharged through such first widely opened check valves and very little or no lubricant would pass through those relatively more closed.

One of the first types of resistance units made was composed of a resistance plug with a helical groove on its outside surface, which was fitted within a tube. These first resistance units also proved unsatisfactory because when placed at different levels, atmospheric pressure would enter the pipeline system, largely through more elevated units and oil would drain or siphon out through relatively lower resistance units. In the effort to prevent this difficulty, both check valves and resistance units were provided in pairs. In such systems employing a valve and a resistance unit for each bearing, when the resistance of the resistance unit to the flow of lubricant was made greater than the resistance of the tightest bearing of the system, the system employing such resistance units each with a separate check valve unit operating as a flow controlling element, greater success was attained.

Of outlets employing both a resistance unit and a check valve, two types are commonly used:

One type employs a resistance plug and a spring pressed check valve of either the ball check valve type, or the flat check valve type comprising a metal disc backed by a spring and a relatively thin leather disc between the disc and the valve seat.

It has been found to be advantageous to make the contacting areas of the thin leather washer and valve seat very small in order to increase the pressure per square inch effective on the now substantially reduced contacting area. This was done for two reasons:

First, because it is then possible to employ a weak valve spring and at the same time to effect a high pressure per square inch between the contacting surfaces of the valve and valve seat;

Second, because it was discovered that because of variations of thickness of the relatively thin leather washer, and irregularities of its outer surface and variations of density thereof, a very uneven fit between the washer and the valve seat is had. An unreliable and leaky valve results if the contacting surfaces of the leather washer and the valve seat are not line-like but cover a relatively large area, except if a very powerful check valve spring is used, this being, however, undesirable, because it materially increases the pressure of lubricant required to unseat it, which in turn, would occasion additional serious difficulties in the design of a manual or automatically operated pump.

As a result of experiments I find that check valves of this last type forced against the valve seat with a relatively weak spring pressure leak, and when several combination resistance units and check valves are used in a pipeline system, that atmospheric pressure will be caused to enter the more elevated check valve resistance units, with the result that the oil in the pipeline system, therefore, siphons out through the lower check valve resistance units, which is very undesirable.

While check valves faced with leather, having a narrow contacting area of so-called line-like form, operate much better than those with a larger contacting area, check valves of this character are still objectional because atmospheric pressure enters the pipeline system, past the valves, with resulting drainage and siphoning, since the relatively small contacting surface is not absolutely leak proof, due to the fact that the pressure exerted against the valve seat cannot be made uniform over the entire area, since finely divided grit passes the finest filtering means, and becomes embedded in the soft, resilient leather or like means employed in this type of check valve construction.

To overcome this difficulty, a second type of check valve has sometimes been employed, wherein an exceedingly thin and flexible check valve material made of so-called empire cloth is employed, which better adapts itself to the small irregularities commonly prevailing in the valve seat surface, due to faulty workmanship, to grit settling on the valve seat.

I find, however, that such valves do not operate satisfactorily if additional spring pressure is used to force such an extremely thin and flexible valve against the valve seat, and that it is imperative that no such other force be employed that will detract from the natural adhesion or suction action of the oil, effecting the seal. I have, therefore, formerly designed a check valve of this type valve as a freely floating disc, floating within lateral bounds within very small limits, preferably not more than .025 part of an inch.

Such freely floating flexible disc valves work well, provided that the rest of the system is in perfect order. However, if atmospheric pressure enters the pipeline system, as through fine cracks in the pipeline, or through leaks of any of the many pipe couplings which may be faultily assembled, then the flexible thin check valve discs of the system, which are disposed at a relatively low level, will immediately open and much, if not all of the oil in the pipeline system drains out, which makes any further distribution of oil to the bearings impossible.

Besides the hereinbefore recited serious difficulties which have been encountered in connection with the various forms of check valve which have been proposed, there have been other equally serious difficulties met with in connection with the types of resistance plugs heretofore employed.

These plugs are in general of two outstanding types. First, a type comprising a metal pin in a bore with a clearance between the bore and the pin of the order of one-thousandth of an inch; and the lubricant being forced through this small clearance. The second type used has comprised a generally cylindrical plug with a screw thread or helical groove turned on its outside cylindrical surface and the plug press-fitted into a cylindrical bore.

Where resistance plugs of the latter type are employed they must be press-fitted into a hole or bore without clearance in order to insure that the lubricant when applied with pressure upon the plug will be forced through and around the helical groove and will not by-pass the plug around the cylindrical surface even when thin lubricating oils are used.

When, however, a plug of the helically grooved type is pressed into its bore, the operation of thus force fitting it produces serious distortion of the helical resistance groove. In some instances, I have found that upon longitudinally pressing the plug into its bore, the lubricant emitting or metering rate of the unit may be varied as much as two hundred per cent over that for which it was designed.

In my present invention I avoid the above described serious difficulties both with the metering resistance element and with the check valve elements by a very simple and efficient construction in which a resistance plug and a check valve are united in a single unit adapted to be preassembled and inserted into the fitting or body portion of the metering unit. That portion of the resistance check valve unit providing the resistance is preferably of the general class referred to comprising a spiral groove in the outer surface of a cylinder; and that portion of the unit performing the functions of the check valve functions generally after the nature of an outwardly expansible cup shaped piston in a cylinder permitting flow of lubricant in one direction, but positively obstructing flow in the opposite direction.

The elements for effecting this dual function of providing resistance and insuring uni-flow of lubricant are assembled into a single unit and the parts so arranged that they may be simply assembled into a smooth bore from one end of a metering unit fitting.

To avoid the hereinbefore mentioned difficulty of mutilating or distorting the helical groove by force-fitting it into its bore, the cylindrical plug is bored out internally and its outside diameter is made small enough so that it may be freely slipped into the fitting bore and after it is in place and without further longitudinal movement thereof, the hollow cylinder is outwardly expanded by suitable means and into tight fitting engagement with the bore of the fitting.

It is, therefore, one of the objects of my invention to provide generally a metering unit of the helical groove resistance plug type in which the plug may be assembled with a tight fit in its bore in the metering unit fitting without mutilation of the helical groove.

Another object of my invention is to provide in a resistance type metering unit, a resistance plug construction of the helical groove type by which the plug may be loosely inserted into its bore in a metering unit fitting and then outwardly radially expanded into tight fitting engagement with the bore.

Another object is to provide in a metering unit of the resistance type a fitting and helical grooved plug construction by which the plug may be brought into tight engagement with the inner cylindrical wall of the fitting without longitudinal press-fitting movement of the plug in the fitting.

Another object is to provide a metering unit plug which may be expanded into forced fitting engagement with its surrounding bore by a cheap and simple tool which may conveniently be left in the plug assembly after performing the expanding operation.

Another object is to provide in a metering unit of the resistance type a check valve of improved construction which will be simple and cheap to manufacture and assemble and efficient in operation.

Another object is to provide in a metering unit of the resistance type a check valve which will contact with its valve seat on a cylindrical area.

Another object is to provide in a metering unit of the resistance type a check valve adapted to engage a seat on a cylindrical area of contact therewith and which may be maintained in leak proof seal engagement with the seat by resilient force acting radially outwardly.

Another object is to provide a check valve for a resistance type metering unit which may be cup shaped and have a resilient cup skirt outwardly radially expanding.

Another object is to provide in a resistance type metering unit a check valve element of generally outwardly radially expanding cup shape engaging as a valve seat a hollow cylindrical bore and in which the flow of lubricant may be controlled by the valve at a port or ports in the cylindrical seat.

Another object is to provide in a resistance type metering unit a check valve element of generally outwardly radially expanding cup shape engaging as a valve seat a hollow cylindrical bore and in which the flow of lubricant may be controlled by the valve at a port or ports in the cylindrical seat and communicating with the helical groove of a resistance type metering plug in the metering unit.

Another object is to provide in a check valve contruction for metering units, a check valve element generally cup shaped and engaging as a seat the inner wall of a hollow cylinder and in which the seal between the valve and the seat may conveniently be controlled by an outwardly radially expansible element within the cup adapted to force the skirt of the cup outwardly radially.

Another object is to provide in a resistance type metering unit a combined resistance plug and check valve which may be assembled into a metering unit fitting by longitudinal movement into a cylindrical bore in the fitting.

Another object is to provide for use in a metering unit of the resistance type a resistance plug and check valve in one preassembled unit.

Another object is to provide a metering unit of the resistance type, a cylindrical bore in the unit fitting, which may serve both as the bore in which a resistance plug may be force fitted and also as the cylindrical seat of a cup shaped check valve element for the unit.

Other objects of my invention and the invention itself will be apparent by reference to the following description of certain embodiments of my invention, and in which description reference will be had to the accompanying drawing illustrating the said embodiment therein:

Fig. 1 is a medial cross-sectional view of a metering unit of the resistance type showing an embodiment of my invention;

Fig. 2 is a view similar to Fig. 1 showing my invention in another embodiment.

Referring to the drawing, I have shown at 1 the main body or fitting of a lubricant metering unit screw threaded on its lower end as at 2 by which it may be threaded into a bearing element or other machine part to be lubricated. The fitting 1 is tubular and the upper portion bored out as at 3 to a larger inside diameter than the bore 4 of the lower portion providing an internal shoulder 5 which in the particular embodiment illustrated is generally conical.

Substantially fitting the bore 3 and abutting the shoulder 5 is a reaction block 6 having part of its longitudinal length bored out axially as at 7 to substantially the outside diameter of a lubricant supply pipe 8 to be referred to, and for the rest of its longitudinal length bored out as at 9 to substantially the inside diameter of the pipe 8 providing a shoulder 10.

Above the reaction block 6 and normally resting thereupon is a packing element 11 of compressible and flowing material such as rubber, having therein an axial bore substantially the diameter of the outside of the pipe 8, but which in the form illustrated has been distorted, in a manner to be described. Upon the packing element 11 is a compression washer 12 of metal or other suitable rigid material of outside and inside diameter substantially equal to that of the bore 3 and of the outside diameter of the pipe 8 respectively.

The extreme upper end of the element is internally threaded as at 15 and thereinto is screwed a packing nut 13 having a head 14 by which it may be turned with a wrench and abutting at its lower end upon the compression washer 12.

In assembling the parts thus far described, the reaction block 6, packing element 11, washer 12 and packing nut 13 are disposed in the general position illustrated in the drawing and then the end of the supply lubricant pipe 8 is inserted axially therethrough into engagement with the shoulder 10. Thereafter the packing nut 13 is screwed inwardly, compressing the packing element 11 between the block 6 and washer 12 and by the application of sufficient force the element 11 is compressed to tightly seal the bore 3, block 6 and washer 12 with the outer wall of the pipe 8 and to constrict or indent the wall of the pipe 8 into an inwardly concave annular neck in the wall as at 16 by which the pipe 8 is mechanically locked or anchored in the fitting 1 against relative longitudinal movement thereof to prevent its being accidentally separated from the fitting 1 by shocks or by the expelling force of the fluid when under great pressure. Between the reaction block 6 and shoulder 5 is preferably provided a straining screen 17 for the lubricant supplied by the pipe 8.

The bore 4 in the lower part of the fitting 1 is preferably cylindrical and has assembled therein a combined resistance plug and check valve unit, so constructed that they may be completely assembled together outside the fitting and inserted into the bore 4.

The unit referred to comprises a resistance plug indicated generally at 18. The plug 18 is preferably of the spiral groove type comprising a main cylindrical body 19 in the external cylindrical surface of which and extending over a portion of the longitudinal length thereof, a helical groove 20 is cut or otherwise formed.

The upper end of the plug 18 terminates at a point spaced from the lower end of the block 6 and screen 17 so that lubricant under pressure from the pipe 8 may flow downwardly and around through the spiral groove 20 and to the lower end of the plug 18.

It is highly essential that the plug 18 shall fit in the bore 4 with a tight or pressed fit. To effect this fit without mutilating the helical groove 20 by longitudinally pressing or force fitting the plug 18 into the bore 4, I provide means for expanding the plug 18 after inserting it in the bore. To this end, the plug 18 is internally axially bored out as at 21 to provide a relatively thin wall 22 for a portion of the longitudinal length of the plug.

In practice then the plug is first freely inserted in the bore 4 and then an expanding tool such for example as a hardened steel ball 23 is inserted in the upper end of the bore 21 and forced axially into the bore stretching and expanding the wall 22 and forcing the plug into intimate compressed contact with the bore 4. At the end of the operation, the ball 23 may be left in the bore 21 permanently.

The combined resistance unit and check valve assembly referred to comprises also a valve element 24 generally of inverted cup shape and composed of outwardly radially expansible resilient material such as leather for example. The bottom of the cup 25 is perforated as at 26 and a screw 27 is inserted therethrough and screwed into a threaded hole 28 along the axis of the plug 18. By means of a washer 29 over the head of the screw 27, the bottom of the cup 25 may be tightly clamped on the lower squared off end 19 of the plug 18, thus securely attaching the cup shaped valve 24 to the plug 18.

The downwardly depending wall or skirt 30 of the cup 24 is cylindrical in transverse cross-section and fits in and seals the bore 4 along a cylindrical contact area therewith substantially co-extensive with the axial extent of the cylindrical skirt 30.

To insure that the skirt 30 will seal the bore 4, it may be formed normally of larger diameter than the bore 4 so that when assembled with the plug 19 and inserted into the bore 4, it will be compressed inwardly radially by the wall of the bore. If desired, to insure sealing of the bore, a resilient element 31 such as an annular split resilient ring may be disposed within the skirt 30 to outwardly radially expand it against the wall of the bore.

The plug 18 and the parts of the valve construction above described are assembled together outside of the bore 4 and then inserted therein and thereafter the ball 23 is forced into the bore 21 to expand the plug 18.

In operation pressure of the lubricant from the pipe 8 may be overcome by resistance of the plug 18 and force its way between the valve skirt 30 and the wall of the bore 4 to effect lubrication as desired and flow of lubricant in the reverse direction as by siphoning or any other cause occurring in the lubrication system is effectively prevented by the sealing of the skirt 30 in the bore 4.

In the form of my invention shown in Fig. 2, the reaction block 6 is omitted and the shoulder 35 and shoulder 36 are provided in the fitting element 1 for the purpose described in connection with Fig. 1; and a screen 37 is placed in the upper portion of the bore 4.

In this form, the bore 4 is again cylindrical but the assembled unit of resistance plug and valve is of different construction. A resistance plug 38 of the external spiral groove type extends inwardly from the extreme lower end 39 of the fitting element 1, an annular flange 40 on the plug determining its inward axial position. Adjacent the lower end of the plug an annular groove 41 is cut in its cylindrical surface into which the lower end of the spiral groove 42 discharges. The plug 38 has an internal axial bore 43 extending from its outer end to a point adjacent its inner end thus leaving the inner end closed as by an end wall 44. A plurality of ports such as 45—45 communicate between the bore 43 and the annular groove 41.

The bore 43 of the plug is sealed by an inverted cup shaped valve element 46, the cylindrical skirt 47 of which fits the bore 43 and covers the ports 45. The bottom 48 of the valve element is riveted as at 49 to an expanding tool 50 having a ball or dome shaped head 51 and adapted to be axially forced into the bore 43 to expand the wall of the plug 38 to force it into fitting contact with the bore 4, as was more fully described in connection with Fig. 1.

In operation, lubricant under pressure after passing through the resistance groove 42 and emptying into the annular groove 41 may be forced through the ports 45 and downwardly around the skirt 47 and be discharged from the metering unit but the ports 45 and the bore 43 will be sealed against return flow.

Having thus described my invention in certain embodiments, I am aware that numerous and extensive departures may be made from the embodiments herein illustrated and described but without departing from the spirit of my invention.

I claim:

1. In a metering unit, a bored body, a resistance plug in the bore and a cup shaped valve element of deformable material connected to and opening away from the plug for sealing the bore outwardly of the plug against reverse flow toward the same, said resistance plug and valve element providing a lubricant flow passage in one direction along the wall of said bored body.

2. In a metering unit, a bored body, a helically grooved tubular resistance plug in said bored body, an annular groove in the plug, ports in the plug wall at the annular groove, a cylindrical valve seat coaxial with the plug at said ports and a cylindrical outwardly expansible valve element connected to the plug and valve and sealing the seat and ports against reverse flow toward the resistance plug.

OSCAR U. ZERK.